(12) United States Patent
Karlsson et al.

(10) Patent No.: US 7,766,263 B2
(45) Date of Patent: Aug. 3, 2010

(54) GRANULATOR MILL

(75) Inventors: Henrik Karlsson, Varnamo (SE); Kurt Sjoberg, Bredaryd (SE); Magnus Blom, Varnamo (SE)

(73) Assignee: Rapid Granulator AB (SE)

( * ) Notice: Subject to any disclaimer, the term of this patent is extended or adjusted under 35 U.S.C. 154(b) by 587 days.

(21) Appl. No.: 11/774,961

(22) Filed: Jul. 9, 2007

(65) Prior Publication Data

US 2007/0290086 A1    Dec. 20, 2007

Related U.S. Application Data

(63) Continuation-in-part of application No. 10/493,198, filed on Apr. 19, 2004, now Pat. No. 7,255,296, and a continuation-in-part of application No. 11/586,173, filed on Oct. 25, 2006, now Pat. No. 7,600,708.

(30) Foreign Application Priority Data

Oct. 19, 2001   (SE)   .................................... 0103499

(51) Int. Cl.
    *B02C 13/00*   (2006.01)
    *B07B 13/00*   (2006.01)
    *B02C 9/04*    (2006.01)
(52) U.S. Cl. ........................ 241/73; 241/242; 241/285.3
(58) Field of Classification Search .................. 241/73, 241/285.2, 285.3, 242
    See application file for complete search history.

(56) References Cited

U.S. PATENT DOCUMENTS

| 246,992 | A | * | 9/1881 | Anderson | .................... 241/138 |
|---|---|---|---|---|---|
| 1,706,643 | A | | 3/1929 | Wiley | |
| 2,756,002 | A | | 7/1956 | Brake | |
| 3,419,223 | A | * | 12/1968 | Morin | .......................... 241/73 |
| 4,000,860 | A | | 1/1977 | Gotham | |
| 4,061,282 | A | | 12/1977 | Walker et al. | |
| 4,198,005 | A | | 4/1980 | Eiff | |
| 4,609,157 | A | | 9/1986 | Thieux | |
| 4,938,425 | A | | 7/1990 | Williams et al. | |

(Continued)

FOREIGN PATENT DOCUMENTS

SE         469926         10/1993

*Primary Examiner*—Bena Miller
(74) *Attorney, Agent, or Firm*—Cantor Colburn LLP

(57) ABSTRACT

A granulator mill has a mill housing which has an openable part and a fixed part, and an infeed hopper; the fixed part includes a rotor with a number of blades which co-operate with fixed blades in the mill housing; the openable part has a discharge section which is discrete from the interior of the mill housing by means of a grid which surrounds approximately 160° of the rotor and extends in beneath it; where the fixed part and the openable part are connected to one another by the intermediary of a pivot device with a vertical pivot axis and the end of the openable part facing away from the pivot axis is fixedly lockable in the fixed part at the journal box of the rotor and is centered there by a guide surface at the journal box and a guide surface on the openable part, the openable part is thus horizontally pivotal and may be opened manually; the infeed hopper is vertically pivotal about a horizontal axis and opened by means of a motor, where the infeed hopper and the openable part have mutually engaging locking means which lock the infeed hopper in the closed position when the openable part is closed.

4 Claims, 10 Drawing Sheets

U.S. PATENT DOCUMENTS 5,199,653 A * 4/1993 Durrant et al. ................ 241/73
5,273,218 A    12/1993 Burns
5,553,797 A    9/1996 Axelsson et al.
5,746,377 A    5/1998 Gehrig

* cited by examiner

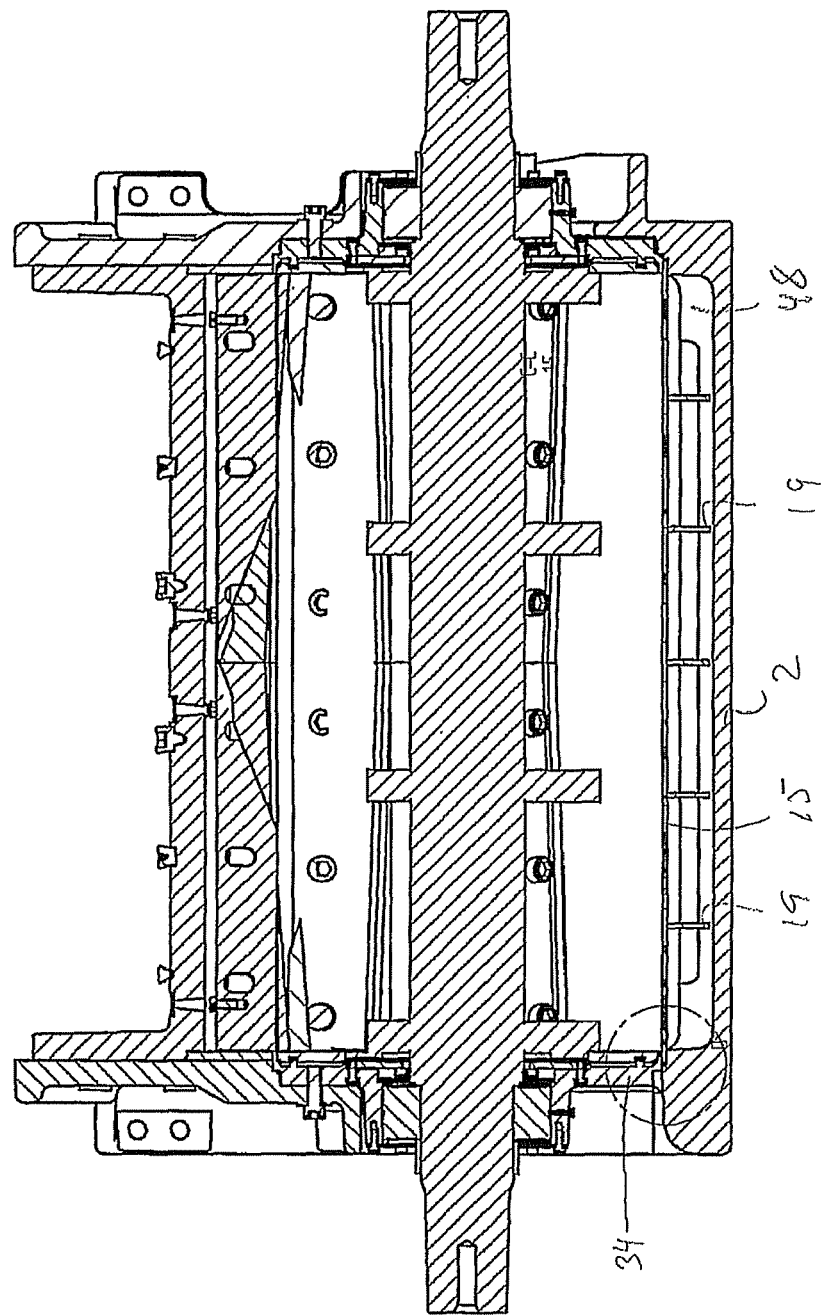
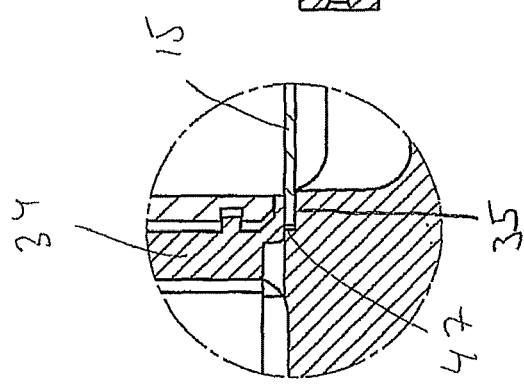
Fig 9
Fully closed

GRANULATOR MILL

CROSS REFERENCE TO RELATED APPLICATIONS

This application is a continuation-in-part of and claims the benefit of U.S. patent application Ser. Nos. 10/493,198 filed on 19 Apr. 2004 and 11/586,173 filed on 25 Oct. 2006, both of which said applications claim priority to Swedish Patent Application No. 0103499-0 filed on 19 Oct. 2001, all of which said applications are incorporated herein by reference in their entirety. This application also claims the benefit of Swedish Patent Application No. 0103499-0 filed on 19 Oct. 2001, which said application is incorporated herein by reference in its entirety.

TECHNICAL FIELD

The present invention relates to a granulator mill which comprises a mill housing with an openable section and a fixed section, a rotor which is rotary inside the mill housing and has a number of blades for co-operation with at least one fixed blade mounted in the mill housing, and a discharge section whose interior is discrete from the interior of the mill housing by means of a grid through which granulate passes from the mill housing to the discharge section.

BRIEF DESCRIPTION OF RELATED ART

In the employment of granulator mills within the plastics industry for recycling or reuse of plastics, it is necessary to carefully clean the interior of the granulator mill before a change can be made to a new plastics quality or plastics color. This entails demands, on the one hand, that the interior of the mill housing must be accessible, as well as the interior of the receptacle section in which the finished granulate is collected and from which the granulate is conveyed off, as a rule via a conduit. For this reason, mill housings have previously been constructed to be openable so that a part is openable in relation to that part in which the rotor of the granulator mill is journalled. In these prior art constructions, the openable part is pivotal about a horizontal axis and suspended in its lower edge.

Constructions of this type entail demands for auxiliary tools on opening and closing the openable part, since this is so heavy that it cannot be handled manually.

The openable part further has a very limited opening angle because of the suspension in an area beneath the mill. The reason for this is that the substrate on which the granulator mill stands quite simply prevents opening of the openable part to any larger opening angle.

Further, it has often been necessary in these prior art constructions first to dismantle the discharge section in order to be able to get at the openable part at all.

Taken as a whole, prior art mills have been difficult to access interiorly so that, as a result, cleaning of a mill has proved to be circumstantial and time-consuming.

BRIEF SUMMARY OF THE INVENTION

The invention provides a granulator mill intimated by way of introduction so that the drawbacks inherent in prior art technology are obviated. In particular, the invention realizes a granulator mill in which the openable part may readily be opened and closed manually without auxiliary tools or aids, where considerably greater access is afforded to the interior of the mill in the open state than has been possible hitherto, and also where the discharge section and grid are readily accessible for cleaning.

The invention will be attained if the granulator mill intimated by way of introduction is characterized in that the openable part of the mill housing is connected to the fixed part by the intermediary of a pivot device with a substantially vertical pivot axis in the normal position of use of the granulator mill.

As a result of these features, the advantage will be afforded that the openable part may readily be opened manually, since its point of gravity does not undergo any change in height on opening and closing. Further, the pivoting about the vertical axis permits the opening angle to be made considerably greater, for which reason accessibility is correspondingly improved.

According to expedient and advantageous embodiments of the present invention, the discharge section and the grid are suitably fixed in and supported by the openable part of the mill housing and are pivotal together therewith.

As a result of these features, it is possible, in a simple and convenient manner to gain access also to these components for cleaning.

BRIEF DESCRIPTION OF THE ACCOMPANYING DRAWINGS

The present invention will now be described in greater detail hereinbelow, with particular reference to the accompanying Drawings. In the accompanying Drawings:

FIG. 9 is a view corresponding to FIG. 8, however with the operable part in fully closed condition.

DETAILED DESCRIPTION OF THE INVENTION

Figure 1:
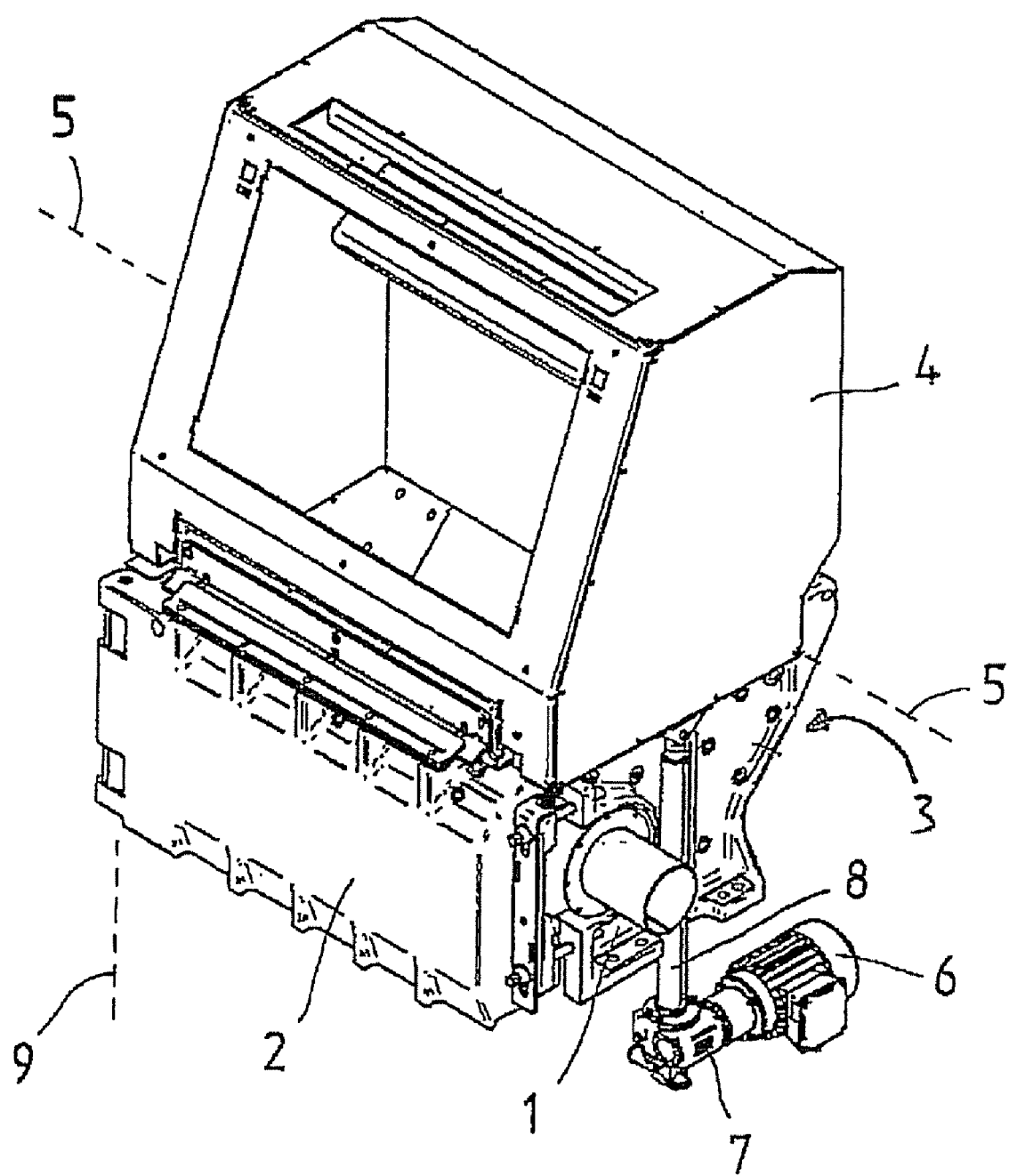
FIG. 1 is a perspective view of a granulator mill seen obliquely from above from a first end of the rotor shaft.
Figure 2:
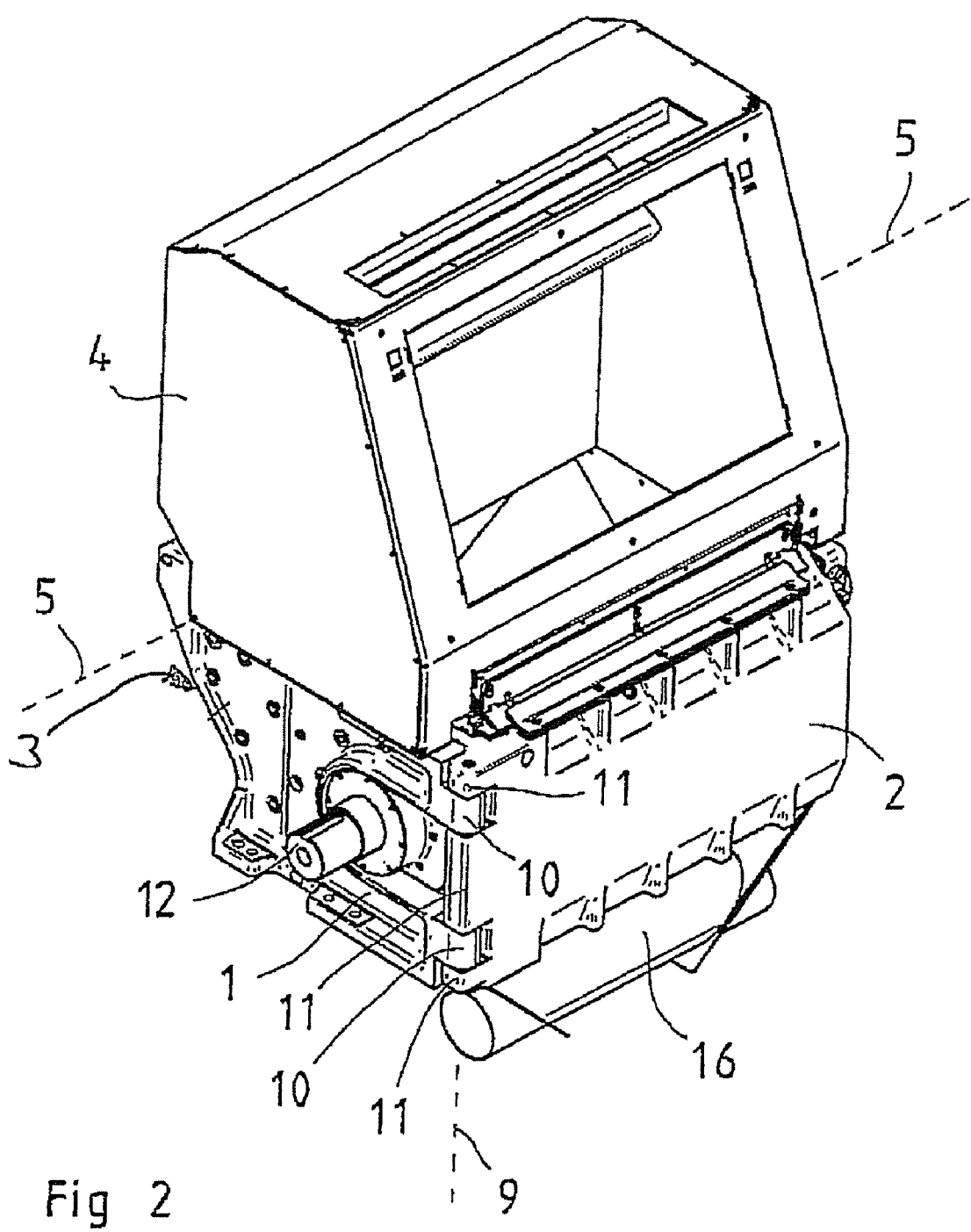
FIG. 2 is a view corresponding to that of FIG. 1, the granulator mill being, however, seen from the opposite end of the rotor shaft.

In FIGS. 1 and 2, which show a granulator mill in perspective seen from different directions, reference numeral 1 relates to a fixed part of a mill housing in which the rotor of the granulator mill is journalled. Correspondingly, reference numeral 2 relates to an openable part of the mill housing, while reference numeral 3 relates to the removable rear side of the mill housing and reference numeral 4 relates to the infeed hopper of the granulator mill. The infeed hopper 4 is openable in relation to the mill housing by pivoting about the pivot axis shown by the broken line 5. Since the infeed hopper is of considerable weight and size, auxiliary equipment is required for opening and closing, in the form of a motor 6, a toothed gear 7 and a screw device 8 connected thereto.

In order to avoid the use of mechanical aids on opening and closing the openable part 2 of the mill housing, this is arranged in such a manner that it substantially does not undergo any vertical displacement during an opening and closing cycle. This is realized in that the openable part 2 is secured in the fixed part 1 of the mill housing by means of a pivot device which is disposed, in the vertical direction, to keep the point of gravity of the openable part 2 substantially constant and which, to this end, is provided with a substantially vertical pivot axis 9 illustrated by broken lines in FIGS. 1 to 3 and 6.

The pivot device with the substantially vertical pivot axis 9 has mutually pairwise engaging guide surfaces, on the one hand on the fixed part 1 of the mill housing and, on the other hand on its openable part 2. These guide surfaces are at right angles to the pivot axis 9 and are disposed, on the one hand on projecting lugs 10 on the fixed part 1 of the mill housing and, on the other hand on projecting lugs 11 on the openable part 2 of the mill housing. In the illustrated embodiment (FIG. 2), it is apparent that the fixed part 1 of the mill housing has four such guide surfaces, which also applies to the openable part 2.

The pivot axis 9 is defined by a cylindrical pin which constitutes the physical pivot shaft between the fixed part 1 and the openable part 2. This implies that the pivot shaft (not shown on the Drawings) guides the openable part 2 in a direction towards and away from the rotor of the granulator mill of which only one stub shaft 12 is shown in FIG. 2.

Figure 3:
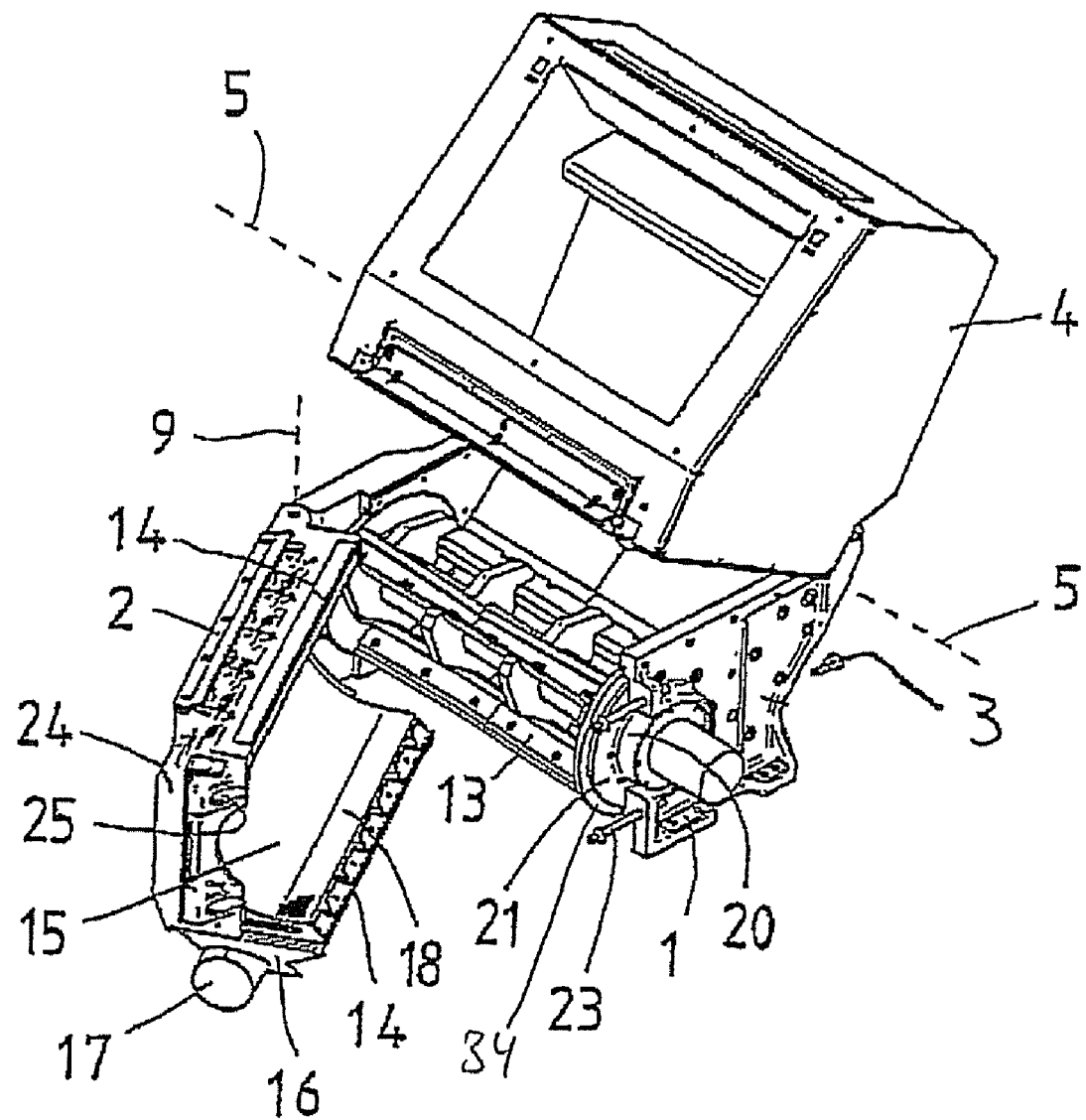
FIG. 3 is a view corresponding to that of FIG. 1, the openable part of the mill housing as well as the infeed hopper of the granulator mill being open.
Figure 4:
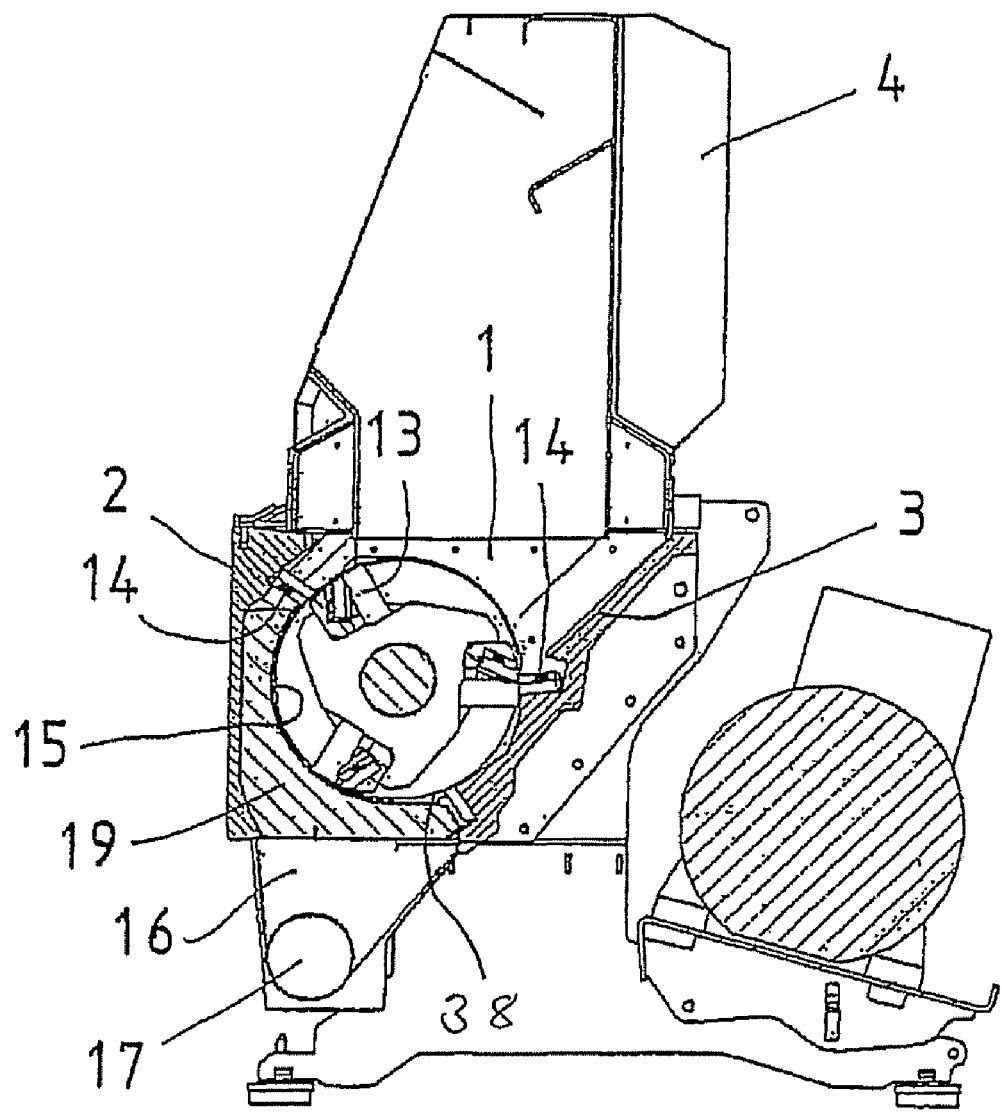
FIG. 4 is a vertical cross section through the granulator mill.

It will be apparent from FIGS. 3 and 4 taken together that the rotor is provided with a number of blades 13 at its periphery, in the illustrated embodiment three in number. Correspondingly, there are fixed blades 14 in the mill housing, both in the fixed part 1 and in the openable part 2, of which blades the openable part has at least one. The fixed blades 14 are disposed closely adjacent to and co-operate with the blades 13 on the rotor and are, therefore, distributed around the peripheral surface of the rotor.

Internally in the rotor, but also internally in the mill housing, there is a space in which the comminution proper of the plastic material into granulate takes place. Where this comminution has proceeded sufficiently, the finely-divided particles or granulate pass through a grid 15 which may have varying mesh size. This grid 15 surrounds the rotor along a part of its periphery. On the underside or outside of the grid, there is a receptacle section 16 in which the granulate is collected and from which the granulate is conveyed off via an outlet 17. The receptacle section 16 has, in the axial direction of the rotor, approximately the same extent as the blades 13 and 14.

According to the present invention, both the grid and the receptacle section 16 are secured in and carried by the openable part 2 of the mill housing and they are, therefore, pivotal together with it. However, it is also conceivable that the receptacle 16 may be arranged on the fixed part 1 of the mill housing.

The grid 15 extends about the periphery of the rotor and in under it and at least up to a vertical line through the center of the rotor shaft, but preferably also a short distance past this vertical line. In order not to impede the opening capability of the openable part 2, the part 18 of the grid 15 located under the rotor is disposed in a tangential plane to the circumference of the rotor, this tangential plane being at right angles to the pivot axis 9. This part 18 of the grid 15 may, therefore, suitably be substantially planar.

As is apparent from FIGS. 3 and 4, the openable part 2 of the mill housing surrounds approximately 140°-180°, preferably approximately 160° of the circumference of the rotor.

Figure 6:
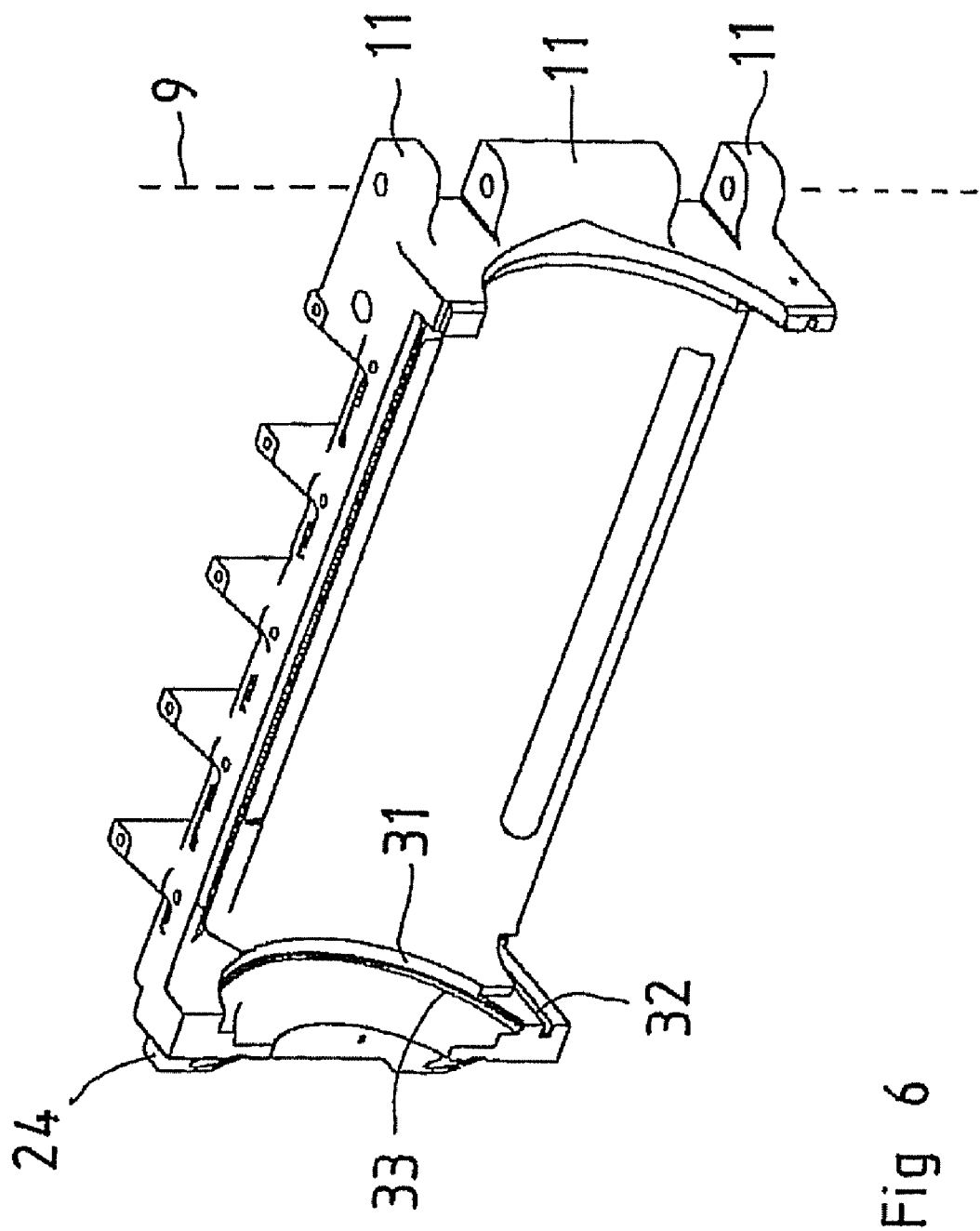
FIG. 6 shows, in perspective, the openable part of the mill housing seen from the inside.

In FIG. 4, reference numeral 19 relates to a number of plates which are disposed with spacing in the longitudinal direction of the rotor shaft and which have edges facing towards the rotor which support the grid 15. These plates 19 lie in the diameter plane to the rotor at right angles to its center axis. Since the grid 15 enjoys good support from the arcuate edge surfaces of the plates 19 facing towards the rotor, the grid 15 is quite simply placed in a recess 31 in the openable part (FIG. 6). As was intimated above, the grid is guided in the radial direction by the above-mentioned plates 19, while, in the axial direction and in the circumferential direction, it is guided and positionally fixed by the edges of the recess 31 in the openable part 2.

The plates 19 are connected together to form an integral unit. This unit is received in a corresponding recess 48 (FIGS. 8 and 9) or could alternatively be slid in place along sliding rails or grooves similar to the grooves 32 for the receptacle section 16.

Removing the plates 19, the receptacle section 16 and the grid 15 is possible only when the openable part 2 of the mill housing is open. Consequently the above components are locked in their correct positions when the openable part is closed.

It will also be apparent from the Figures that the receptacle section 16 is placed beneath the openable part 2 of the mill housing. Suitably, the receptacle section 16 may be guided in a pair of sliding rails or grooves 32 on the underside of the openable part 2 so that the receptacle section 16 may thereby readily be drawn out from or slid into position again beneath the openable part 2.

In the open state of the openable part 2, approximately ¾ of the periphery of the rotor is free and readily accessible for cleaning. Further, after lifting off the grid 15, it is simple to gain access to the inside of the openable part 2 in the plates 19 but also the interior of the receptacle section 16.

In FIG. 3, the openable part 2 is shown in only the partly open state. If the space around the granulator mill permits, the openable part may be opened to up to circa 180° about its pivot axis 9, which implies extraordinarily good access to the interior parts of the mill. For positioning the openable part in the correct position when this is located in the closed position, both it and the fixed part 1 of the mill housing have mutually engaging guide members.

Figure 5:
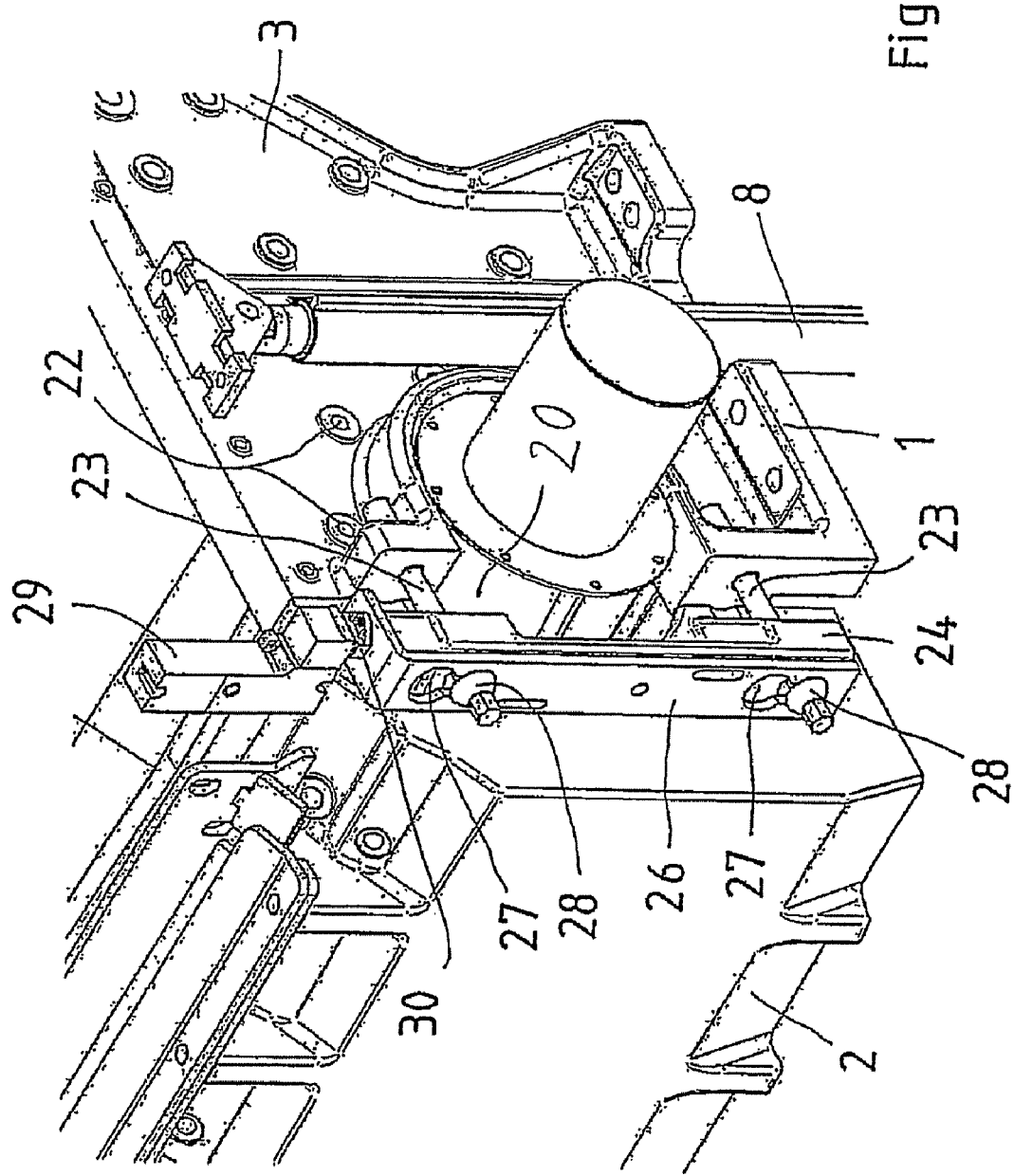
FIG. 5 is, on a larger scale, a perspective view of the region according to the arrow 1 in FIG. 1.

FIGS. 3 and 5 show the one journal box 20 for the shaft of the rotor. The journal box 20 has a projecting flange 21 (FIG. 3) by means of which the journal box 20 is secured in the fixed part 1 of the mill housing with the aid of a number of bolts 22 (FIG. 5). The peripheral edge of the flange 21 serves the purpose of guide surface which is accommodated in a corresponding seat or recess 33 on the openable part 2 of the mill housing. As a result, the openable part of the mill housing will accurately be positioned in relation to the rotor.

In order to realize reliable engagement between the guide surface and the seat use is made of bolts 23 which, with their one end, are secured in the fixed part 1 of the mill housing and which, with their other end, extend through a projecting edge portion 24 of the openable part 2. The bolts 23 may be secured in the fixed part 1 of the mill housing and may, therefore, also be designated pin bolts which extend through apertures 25 in the projecting edge portion 24. On the outside of this edge portion, use is made of a locking rail 26 which has keyway-shaped apertures 27. After release of the nuts 28 on the bolts 23, the locking rail 26 may be moved downwards so that it can be removed from the nuts in that these pass through the greater part of the apertures 27.

Reference numeral 29 (FIG. 5) relates to a safety switch which is secured in the infeed hopper 4 and which fixedly locks a key 30 which is secured on the locking rail 26 when the granulator mill is in operation and at least during as a long a time as is required for the rotor to have time reliably to have parked once the drive motor of the rotor has been turned off. Only when this has taken place can the locking rail 26 and the key secured therein thus be removed and thereby the openable part 2 of the mill housing be opened. In a corresponding manner, the rotor cannot be restarted until the infeed hopper 4 is closed so that the safety switch 29 is located in the correct position for inserting the key 30 when the locking rail 26 has been put in place.

Figure 8:
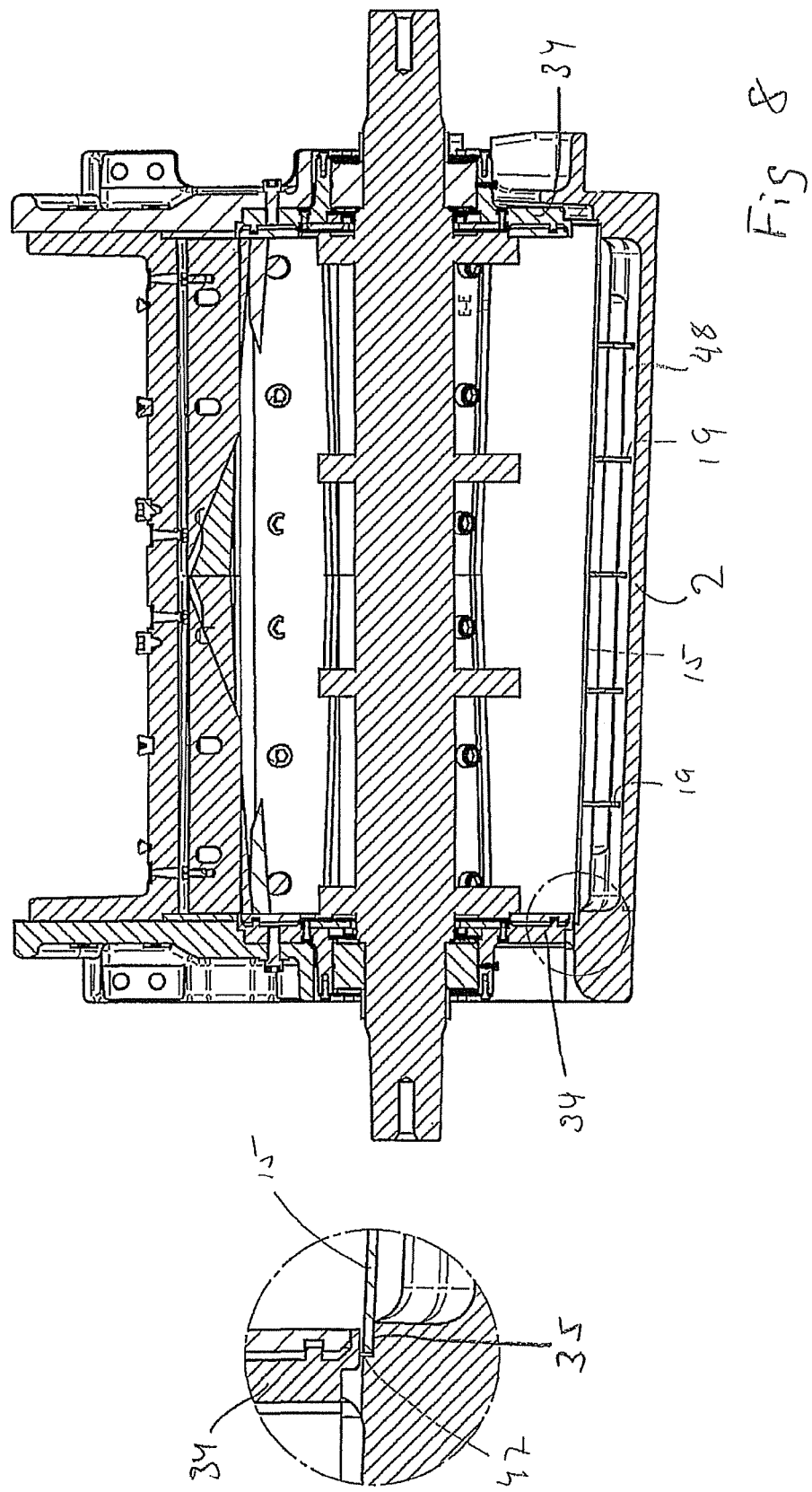
FIG. 8 is a horizontal cross section through the rotational axis of the rotor when the operable part has been opened 2°.

In FIGS. 3, 8 and 9 is shown protruding flanges 34 extending radially beyond the flanges 21 and arranged adjacent to them. The protruding flanges 34 have circular or cylindrical outer surfaces with a radius (as measured from the rotational axis of the rotor) that is substantially equal to the radius of the inner cylindrical surface of the grid 15. The grid 15 also has an outer substantially cylindrical surface the radius of which is equal to the radius of the inner surface plus the thickness of the grid material.

In the openable part 2 of the housing here are provided cylindrical clamping surfaces 35 provided in cylindrical recesses 31 (FIG. 6) provided at both ends of the openable part 2. Side surfaces 47 of the recesses 31 position the grid 15 in its longitudinal direction.

When closing the openable part 2 of the housing opposing end portions of the grid 15 are securely clamped between the cylindrical outer surfaces of the flanges 34 and the clamping surfaces 35 on the openable part 2 of the housing. This implies that minor imperfections as regards the shape of the grid 15 are corrected by this clamping. Further, the grid 15 is securely held in place preventing it from vibrating and rattling during operation of the granulator mill.

In addition to the clamping action the grid is also supported in the radial direction by cylindrical su0pport surfaces 39 along the edges of the plates 19. The support surfaces 39 abut the outer surface of the grid 15.

In the rotational direction the grid 15 is also held in position by means of bent portions or flanges 36 and 40 along the longitudinal edges of the grid 15. The flanges are received in corresponding recesses in the plates 19.

Figure 7:
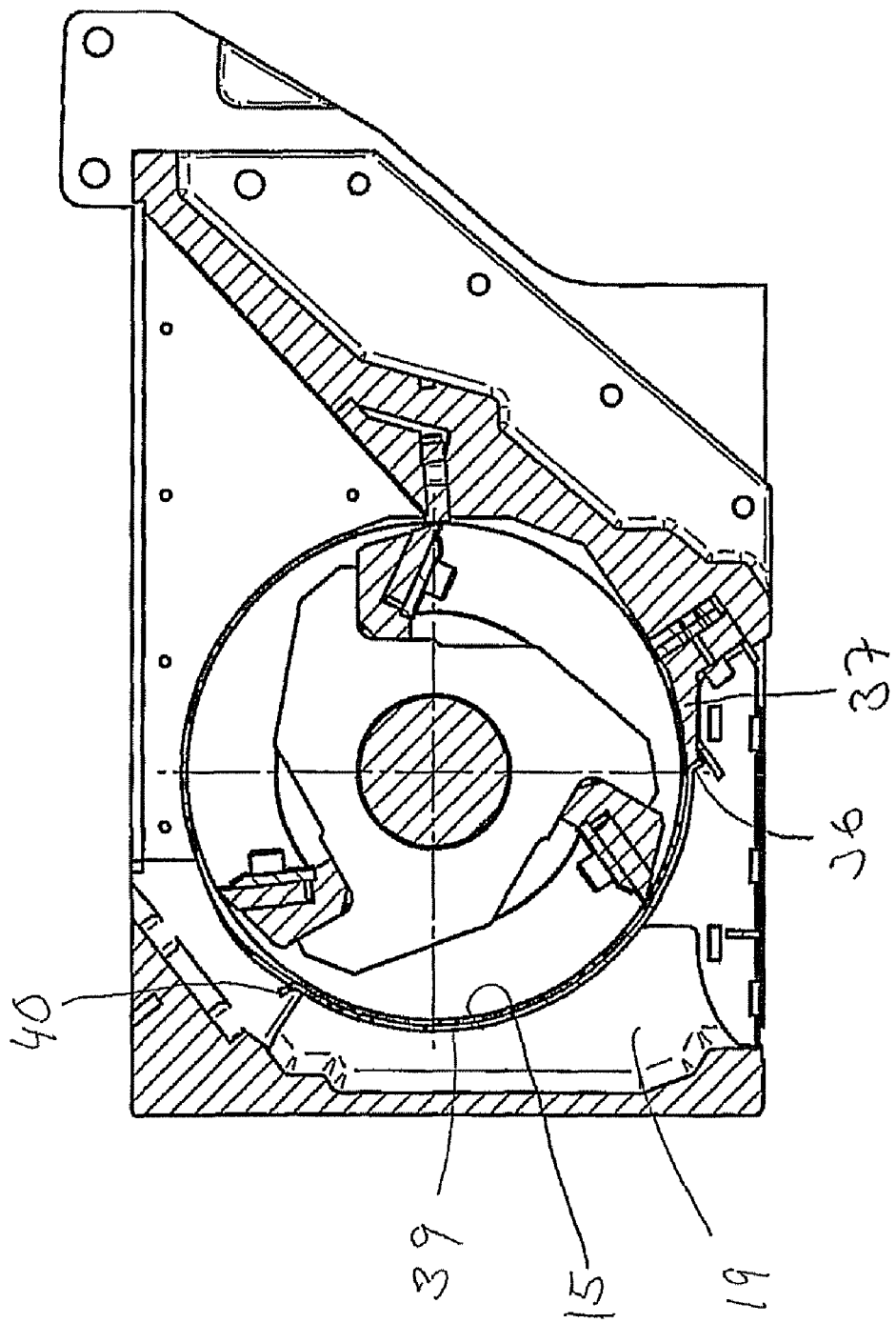
FIG. 7 is a vertical cross section corresponding to FIG. 4.

In the embodiment of FIG. 7 the grid 15 does not have the horizontal part 18 extending beyond (to the right in FIG. 4) a vertical plane defined by the rotational axis of the rotor. In this embodiment the lower longitudinal edge of the grid 15 is located right below the rotational axis and is bent radially outwardly at 36 (FIG. 7). This bent portion 36 of the grid rigidifies the edge portion and is received in corresponding notches in the plates 19 carried by the openable part 2 of the housing.

In this embodiment the fixed part 1 of the housing has an extended portion 37 extending to a position right below the rotational axis of the rotor and substantially into abutment with the grid 15, particularly its bent portion 36. By providing this extended portion 37 the wedgelike space 38 (FIG. 4) between the rotor, particularly its blades 13, and the horizontal part 18 of the grid 15 is eliminated. Such space 38 could cause jamming of partially granulated material between the rotor, particularly its blades 13, and the horizontal portion 18 of the grid 15, thereby imposing very big loads to the grid 15 and its support plates 19.

Figure 10:
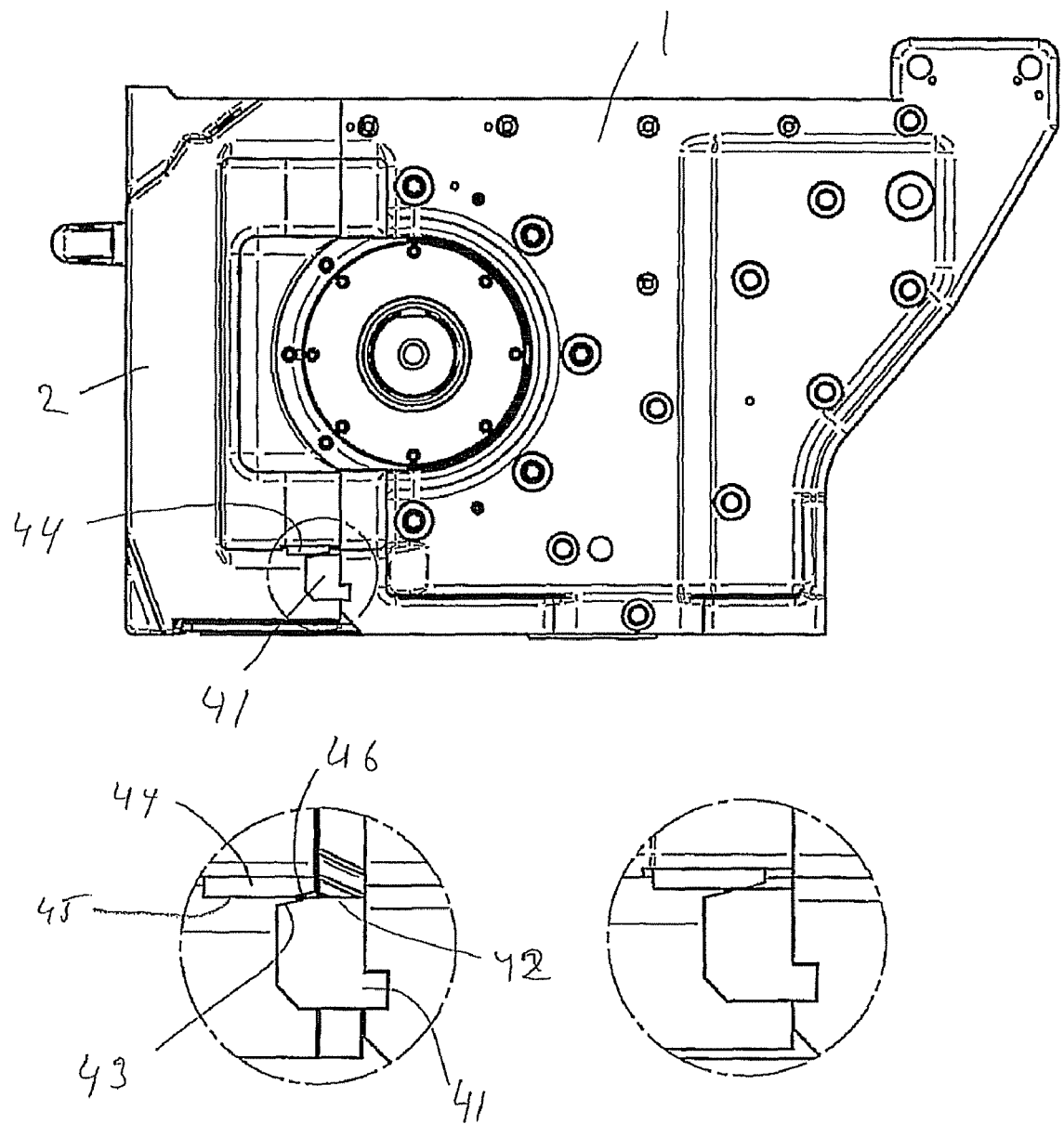
FIG. 10 is an end view of the mill housing as seen from the right in FIG. 1.

From FIG. 10 is evident that there is provided on the fixed part 1 of housing a guide body 41 having one upper horizontal support surface 42 and one inclined guide surface 43. The guide body is located at the same side of the fixed part 1 of the housing as the bolts 23 and is therefore located for cooperating with the distal end of the openable part 2 of the housing and particularly with its lower side. To engage the guide body 41 the openable part 2 has a sliding body 44 having one horizontal support surface 45 to be supported on the support surface 42 of the guide body 41 when the openable part is fully closed or at least almost fully closed, i.e. along the last few millimeters of the closing movement. By the engagement of the two support surfaces 42 and 45 the height position of the distal end of the openable part 2 is very accurately defined.

The sliding body 44 also has a inclined guide surface 46 at its front end as seen in the closing direction of the openable part 2. During the closing movement, as is apparent from the left enlarged view, the two inclined guide surfaces 43 and 46 first comes into contact with one another. When the closing movement then continues the upper guide surface 46 slides up along the lower one 43 until the two support surfaces 42 and 45 comes into engagement as is disclosed in the right enlarged view showing the fully closed position.

The above sliding cooperation of the guide body 41 and the sliding body 44 is essential for allowing the openable part 2 to be properly closed as its distal end has a tendency to hang down due to gravity, possible play in the pivot arrangement 9, 10 and 11 and slightly bending of the material of the fixed part 1 of the housing. In big granulator mills having a length of the rotor of 1.2 m the amount of deflection of the distal end of the openable part 2 could be 1.5-3 mm.

The present invention may be further modified without departing from the scope of the appended claims.

What is claimed is:

1. A granulator mill comprising:

a mill housing with one openable part and a fixed part;

a rotor which is rotary inside the mill housing and has a number of blades for co-operation with at least one fixed blade mounted in the mill housing; and a discharge section whose interior is discrete from an interior of the mill housing by means of a grid through which granulate passes from the mill housing to the discharge section, wherein the openable part of the mill housing is connected to the fixed part by the intermediary of a pivot device with a pivot axis which is substantially vertical in a normal position of use of the granulator mill;

wherein at least one fixed blade is provided on the openable part;

wherein the discharge section is secured in and carried by the openable part of the mill housing and is pivotal together therewith;

wherein the openable part of the mill housing has recesses for receiving the grid, clamping surfaces being provided at bottoms of the recesses and on the fixed part of the mill housing for securely clamping the grid therebetween when the openable part of the mill housing is in fully closed position.

2. The granulator mill as claimed in claim 1 further comprising a number of support plates on the openable part of the mill housing, said plates being located in diameter planes to the rotor when the openable part of the mill housing is in fully closed position, said plates having curved edge surfaces abutting an outer side of the grid.

3. The granulator mill as claimed in claim 2 wherein the plates are connected together to form an integral unit received in a corresponding recess in the openable part of the mill housing.

4. A granulator mill comprising:

a mill housing with one openable part and a fixed part;

a rotor which is rotary inside the mill housing and has a number of blades for co-operation with at least one fixed blade mounted in the mill housing; and a discharge section whose interior is discrete from an interior of the mill housing by means of a grid through which granulate passes from the mill housing to the discharge section, wherein the openable part of the mill housing is connected to the fixed part by the intermediary of a pivot device with a pivot axis which is substantially vertical in a normal position of use of the granulator mill;

wherein at least one fixed blade is provided on the openable part;

wherein the discharge section is secured in and carried by the openable part of the mill housing and is pivotal together therewith;

wherein at a free end of the openable part of the mill housing remote from the pivot device there are provided on the fixed and on the openable parts of the mill housing co-operating inclined surfaces for lifting the free end of the openable part of the mill housing to a correct vertical position along a last few millimeters of movement when closing the openable part of the mill housing.

* * * * *